March 24, 1925.
E. A. KEELER
CONTROL METHOD AND APPARATUS
Filed April 16, 1920     3 Sheets-Sheet 1
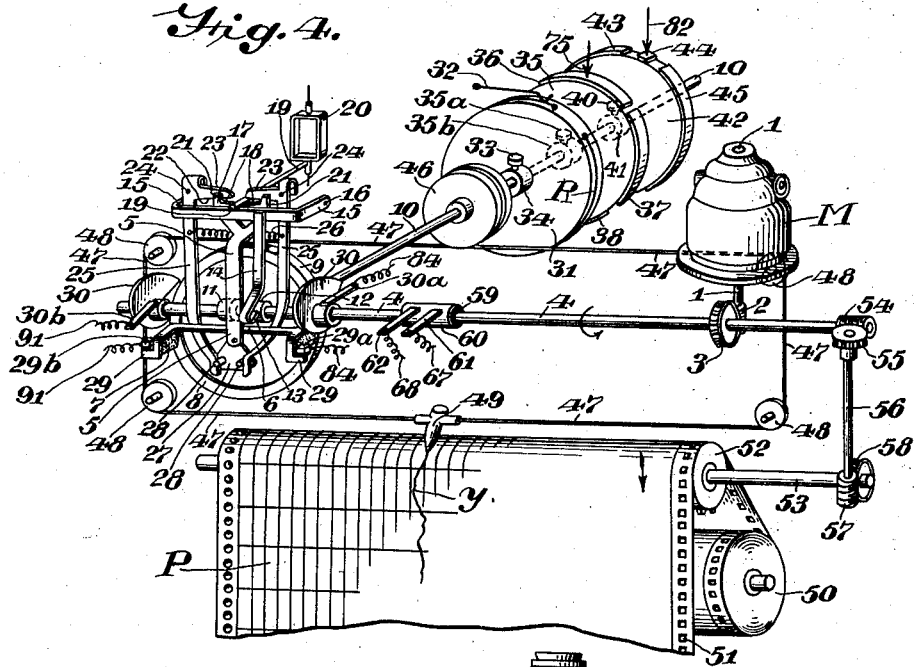
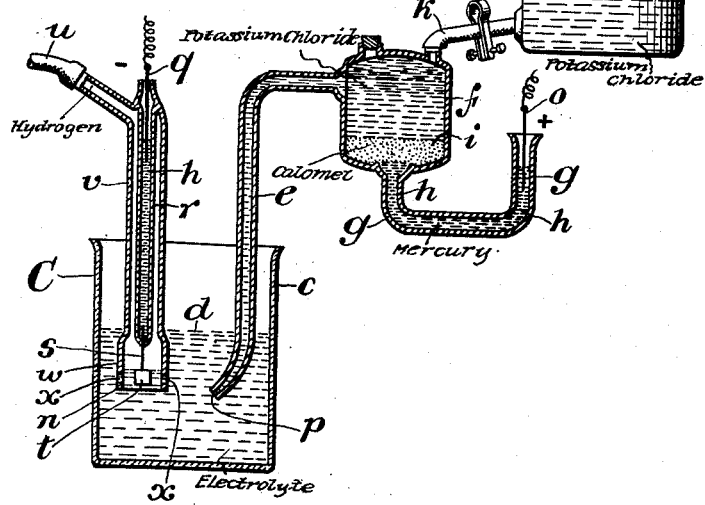
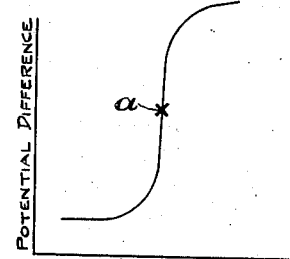
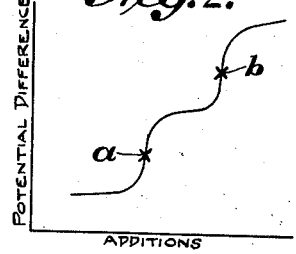
INVENTOR.
Earl A. Keeler
BY Cornelius D. Ehret
his ATTORNEY.

March 24, 1925.

E. A. KEELER 1,530,833

CONTROL METHOD AND APPARATUS

Filed April 16, 1920    3 Sheets-Sheet 2

INVENTOR.
Earl A. Keeler
BY Cornelius D. Ehret
his ATTORNEY.

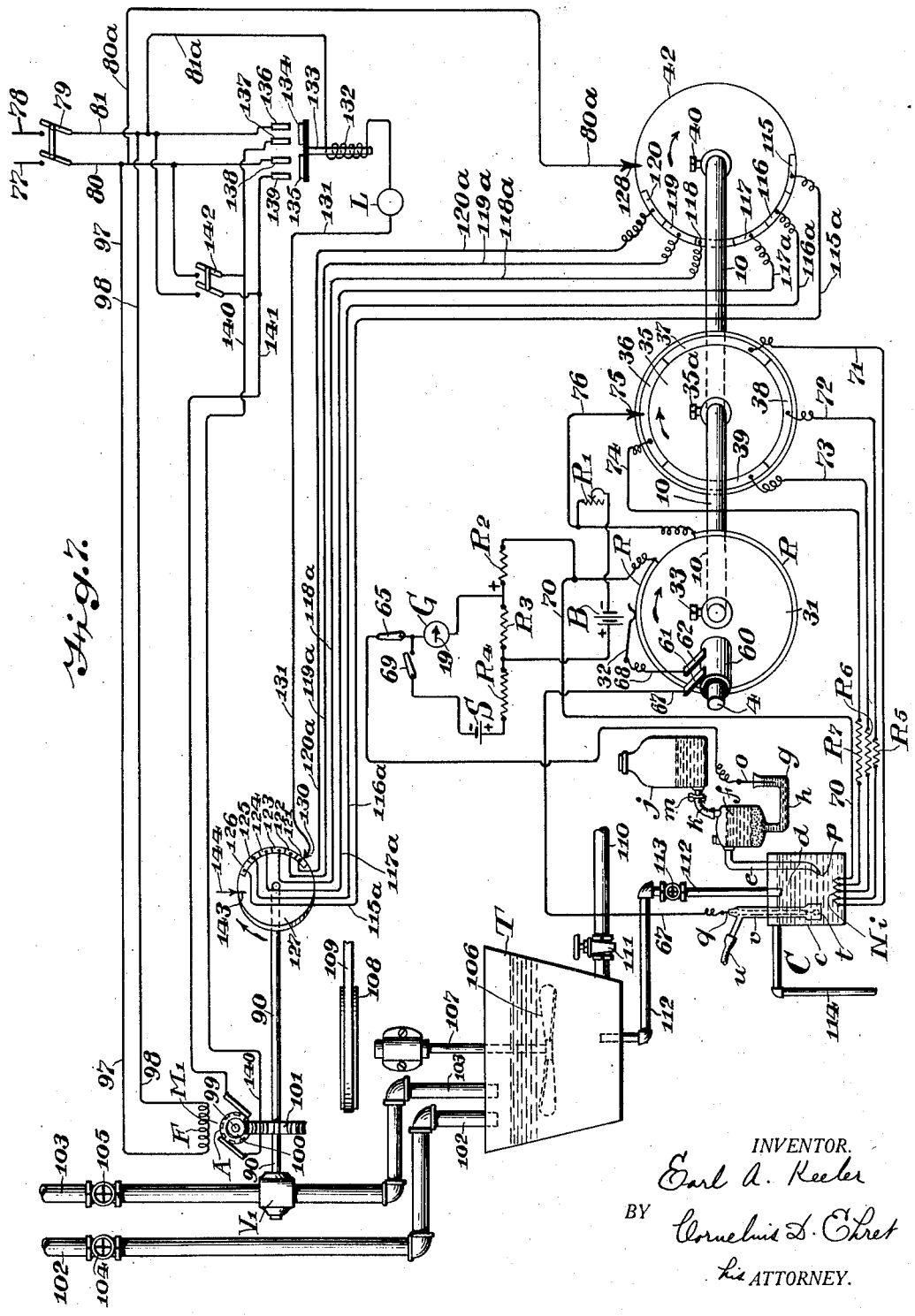

Patented Mar. 24, 1925.

1,530,833

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

CONTROL METHOD AND APPARATUS.

Application filed April 16, 1920. Serial No. 374,267.

*To all whom it may concern:*

Be it known that I, EARL A. KEELER, a citizen of the United States, residing in Norristown, county of Montgomery, State of Pennsylvania, have invented certain new and useful Improvements in Control Methods and Apparatus, of which the following is a specification.

My invention relates to a method of and apparatus for effecting controls in response to variations of the hydrogen, hydroxyl (OH) or other ion concentration of a solution.

My invention resides in a method and apparatus of the character referred to wherein the variation in concentration in a solution of suitable or selected ion or ions effects a variation in the difference of potential between suitable electrodes of a cell whose excitant is that solution, and the variation in potential difference effects through suitable apparatus controlled thereby any suitable control, but more particularly and preferably a control of admixture or variation of proportions of reagents, chemicals, etc., in either batch or continuous processes.

My invention resides also in methods and apparatus hereinafter described and available for general use or in relation to methods and apparatus of the character above referred to.

This application is in part a continuation of my prior application Serial Number 351,177, filed January 13, 1920.

For an illustration of some of the many forms my apparatus may take, and for an understanding of some of the various modes of practicing my methods, reference is to be had to the accompanying drawings, in which:

Figs. 1 and 2 are graphic representations of potential difference—ion concentration characteristics.

Fig. 3 is a vertical sectional view, partly in elevation, of one of many forms of cell structure and accessories which may be employed.

Fig. 4 is a perspective view of a suitable form of control and recording apparatus which may be employed.

Fig. 5 is a diagrammatic view of one of the various circuit arrangements which may be employed in practicing my invention.

Fig. 6 is a fragmentary view illustrating part of the structure of Fig. 5.

Fig. 7 is a diagrammatic view of a modified form of circuit arrangements which may be employed in practicing my invention.

It is known that in many chemical processes or reactions there occur changes of magniture or nature of the ionic concentrations in the solutions undergoing chemical reaction or change. It is further known that such changes in the magnitude or nature of the ionic concentration produce predetermined or definite change in the voltages or differences of potential between electrodes immersed in a solution in which such changes of ionic concentration are occurring.

Suppose, for example, it is desired to determine the end or neutral point of an acid-alkali titration. In the solution or electrolyte to be titrated are immersed two suitable electrodes, one of which may be a standard liquid electrode, such as the calomel half cell and the other may be, particularly when hydrogen or hydroxyl ion concentration is involved, a hydrogen electrode. Assuming the solution to be originally acid, alkali is added in successive increments and the voltage or potential difference between the electrodes of the cell is measured. The characteristic behavior is that indicated in Fig. 1, wherein ordinates are potential differences or voltages of the cell, while abscissae represent additions, i. e., quantities of chemical added, or changes in ionic concentration. It will be noted, progressing from left toward the right, that the voltage, as of an acid solution, is normally low, rising at first slowly and then more rapidly with additions of alkali and thereafter as neutrality is closely approached, the voltage rises rapidly, and the end or neutral point *a* corresponds with a considerably higher voltage. This characteristic being known, by adding alkali until the voltage corresponding to the point *a* is reached, ensures that neutralization has been effected. Further additions of alkali cause further increases in voltage first at rapid rate and thereafter at far lower rate.

In Fig. 2 is shown a characteristic in general similar to that illustrated in Fig. 1, but having the further peculiarity that in the case of some acids neutralization may be effected by making additions of suitable reagent corresponding to the point $a$, but upon further additions a quasi-acid condition again obtains which is not neutralized until further additions corresponding to the point $b$ have been made. For example, when the acid is orthophosphoric, suitable addition of sodium hydroxide, for example, will effect the formation of a primary phosphate corresponding substantially with the point $a$, Fig. 2; addition of further sodium hydroxide will then effect a secondary phosphate corresponding substantially with the point $b$, Fig. 2.

Upon these fundamental known facts is based at least as to some of its important aspects the subject matter hereof.

An example of a suitable form of cell which may be employed when there are involved changes in the concentration of hydrogen or hydroxyl ions is illustrated in Fig. 3, wherein the cell C comprises a beaker $c$ or other suitable container, which need have only relatively very small capacity and in which is held a solution or electrolyte $d$ of which the ionic concentration is involved. The positive electrode is one of liquid $p$ at the capillary or restricted orifice of a glass or other tube $e$ communicating with the vessel $f$ having the tubular extension $g$ containing, for example, mercury $h$ with which in the bottom of the vessel $f$ contacts the solution of potassium chloride containing calomel, i. e., monochloride of mercury, a supply of which in powdered form is indicated at $i$ in the bottom of the vessel $f$. From any suitable reservoir or bottle $j$, containing, for example, a tenth normal solution of potassium chloride, there is a connection $k$, controlled by the cock $m$, to the vessel $f$, which receives the potassium chloride solution in which is dissolved some of the calomel, the solution extending through the tube $e$ into contact with the solution $d$ at $p$. From time to time the flow of solution through the tube $e$ into the solution $d$ may be effected by opening the cock $m$, or a steady flow, for flushing purposes, may obtain by causing the cock $m$ to be continuously partially open. Into the mercury $h$ extends the conductor $o$ constituting the positive terminal of the cell. The terminal of the negative electrode structure $n$ of the cell is indicated at $q$ extending into the mercury $h$ within the inner tube $r$ through whose lower end is sealed the conductor $s$ in contact with the mercury $h$ and connecting with and supporting the plate $t$, as of platinum or gold, usually covered with platinum, iridium or palladium black, in contact with electrolyte $d$ and hydrogen gas supplied under suitable pressure through the tube $u$, into the interior of the outer tube $v$, passing downwardly through the annular space between tubes $r$ and $v$, into contact with the aforesaid plate $t$ within the bell or chamber $w$ and passing out through the lateral apertures or holes $x$ and bubbling up through the solution $d$ and escaping to the atmosphere. Such a cell or equivalent thereof is the control cell from which is initiated the controls of the character hereinafter described, the solution $d$ being a portion of one before receiving addition of chemical for any desired purpose or reaction, or being a sample of a solution to which a reagent has been added or applied, the control hereinafter described being utilizable in admixing with a solution a reagent or reagents or in varying the proportions of reagent to a solution in response either to the condition of the solution prior to introduction of reagent or as a result of the effect of the added reagent or reagents.

When the concentration of other than hydrogen ions is involved, the negative electrode will be suitably different from the hydrogen electrode above described. For example, if concentration of chlorine ions is involved, chlorine gas may be delivered through the tube $u$ into contact with the plate $t$. For oxidation and reduction the electrode $t$ may be ordinary platinum and no gas is delivered through tube $u$.

Of the control apparatus that part more immediately under the control of or affected by the control cell is indicated in Fig. 4 in perspective, and is of a character similar to that disclosed in Letters Patent of the United States No. 1,125,699, it being understood, however, that my invention comprehends any other suitable or equivalent structure.

In Fig. 4 M is an electric motor, or any other suitable source of power, which rotates the shaft 1, preferably at substantially constant speed, which in turn drives the worm 2 meshing with and driving the worm gear 3 secured upon the shaft 4. Pivoted near its upper end is a lever 5 back of which and pivoted upon lever 5 on a horizontal axis is the arm 6 on each end of which is a shoe 7 of cork or other suitable material frictionally engaging the rim 8 of the clutch disk or wheel 9 secured upon the shaft 10. Secured upon the shaft 4 is a cam 11 which periodically engages the lever or member 5 and moves it outwardly away from the disk 9 in opposition to a spring, not shown, thereby lifting the shoes 7 free from the rim 8 of clutch disk 9, the aforesaid spring returning the shoes 7 into engagement with the rim 8 after predetermined rotation of the cam 11. Upon the shaft 4 is secured a second cam 12 which, after the cam 11 has lifted the shoes 7 from rim 8, actuates the end of finger 13 on the lower end of the arm 14 secured at its upper end to the member 15 pivoted at 16. Upon the frame or member 15 is secured the member 17, whose upper edge 18 is inclined and increases in height from the center toward each side. Disposed immediately above the edge 18 is the needle or pointer 19 of any suitable measuring or indicating instrument, as for example, a galvanometer of which 20 is the movable coil or element which swings or deflects the needle or pointer 19. At opposite ends of the member 17 are the abutments 21 for limiting the deflection or swing of needle 19. Directly above the needle 19 and beneath which it normally freely swings are the edges 22, preferably straight and horizontal, upon members 23, 23 pivoted at 24, 24 and extending toward each other, leaving a gap of sufficient width between their inner ends to allow the free entry of the needle 19 when in balanced, zero or mid-position, the needle 19 normally swinging freely between the edges 18 of members 17 and the lower edges of the members 23, 23 which have the downwardly extending arms 25, 25 drawn towards each other by the spring 26. Attached to the lower end of the arm or lever 5 is the triangular plate 27 carrying the pins 28, 28 co-operating with the lower ends of members 25, 25. At opposite ends of the arm 6 are the ears or lugs 29, 29 carrying insulated contacts $29^a$ and $29^b$ adapted to be engaged by the cams 30, 30 similar in shape and similarly positioned and secured upon the shaft 4.

Secured upon the shaft 10 is a disk or wheel 31 of insulating material carrying upon its periphery the resistance conductor R, which may be disposed in the form of a helix laid upon the wheel 31. Engaging the resistance R is the stationary contact 32. The disk 31 may be secured to the shaft 10 in any suitable angular relation with respect thereto by the set screw 33 threaded through the hub 34 through which the shaft 10 extends.

Secured upon the shaft 10 is a second wheel or disk 35 carrying the arcuate contacts 36, 37, 38 and 39 insulated from each other and preferably from the remainder of the apparatus. The disk 35 is held in any suitable angular position upon the shaft 10 by the screw $35^a$ threaded through the hub $35^b$ through which the shaft 10 extends.

Upon the shaft 10 is similarly secured by screw 40 and hub 41 a third disk 42 carrying the arcuate contacts 43, 44, and 45, all insulated from each other and from the remainder of the apparatus.

Secured upon the shaft 10 is the grooved pulley or wheel 46 around which passes the cord 47 which passes over suitable pulleys 48 and secured to the marker or recorder pen 49, movable transversely, on guides, not shown, with respect to the recorder paper P stored upon a roller or spool 50 and having the marginal perforations 51, engaging teeth or pins upon the periphery of the roller 52, secured upon the shaft 53 which is driven by the motor M through the worm 54, gear 55, shaft 56, worm 57 and gear 58.

Secured upon the shaft 4 is a cylindrical member 59 of insulating material carrying the metallic commutator or rotary switch segment 60 with which co-act the brushes 61 and 62 for purposes hereinafter described.

The cams 30, 30 are insulated from the shaft 4 and the remainder of the apparatus and with them are continuously in contact the brushes $30^a$ and $30^b$, whereby when either cam member 30 is in contact with its corresponding contact $29^a$ or $29^b$, electrical communication is established with one of the brushes $30^a$ or $30^b$ and the corresponding contact $29^a$ or $29^b$, the duration of contact in each instance depending upon the extent of deflection of needle 19 and therefore upon the extent of angular displacement of the arm 6.

Referring to Fig. 5, the control cell C has its positive terminal $o$ connected by conductor 64 through switch 65 to one terminal of the galvanometer G, which is preferably of high resistance and whose moving coil is the aforesaid coil 20, Fig. 4. The other terminal of the galvanometer G is connected by conductor 66 to potentiometer structure comprising the aforesaid resistance R upon rotating disk 31, adjustable resistance $R^1$, resistances $R^2$ and $R^3$ all in series with each other and the battery B. The negative terminal $q$ of the control cell C is from time to time connected by conductor 67 to the aforesaid brush 61, through the same and the commutator segment 60 to brush 62 and thence through conductor 68 to the stationary contact 32 bearing upon the aforesaid resistance R. By this arrangement the control cell C is in series with the galvanometer G in a branch connected in parallel between a variable part of the resistance R and the resistance $R^2$. The strength of current through the resistances R and $R^2$ is varied by the resistance $R^1$ to a suitable predetermined value. This potentiometer current may be checked from time to time by opening the switch 65 and closing the switch 69, whereby the galvanometer G is brought into series circuit with the standard cell S, resistance $R^3$ and resistance $R^4$, and the resistance $R^1$ adjusted until the deflection of the needle 19 of the galvanometer G is nil, whereupon it is known that the potentiometer current has been adjusted to a predetermined normal or standard value.

For compensating for temperature variations of the solution $d$ of the control cell C is provided the resistance $Ni$ of nickel or other suitable positive temperature coefficient material subjected to the temperature of the solution $d$, as by covering the resistance $Ni$ and submerging it in the solution $d$. From one terminal of the resistance N$i$ connection is made by conductor 70 to one terminal of the resistance R and from the other terminal by conductor 71 with segment 37 upon disk 35. From any suitable number of points intermediate the ends of the resistance N$i$ connections are made through conductors 72, 73 and 74 with contact segments 38, 39 and 36 on the disk 35, and in series in these conductors 72, 73 and 74 are serially connected resistances $R^5$, $R^6$ and $R^7$, of progressively increasing magnitudes, and all preferably of practically zero temperature coefficient material, as for example, manganin wire.

Cooperating with the contact segments upon the disk 35 is the stationary contact or brush 75 connected by conductor 76 with the other terminal of the resistance R. By this structure the resistance R is shunted by connecting the same amount of resistance, at a given temperature, whichever of the segments upon disk 35 is in engagement with contact 75. Assuming the resistance N$i$ to have a total resistance of 100 ohms between its extreme terminals at a temperature of the solution $d$ of 20 degrees centigrade, each of the four parts thereof will have a resistance of about 25 ohms each. When the brush 75 is in engagement with contact 37 there will be approximately 100 ohms connected in shunt to the resistance R; when contact 38 is in engagement with brush 75, three-fourths of the resistance N$i$ will be in series with resistance $R^5$, which latter may be of 25 ohms, whereby again about 100 ohms total is shunted to the resistance R. Similarly, resistances $R^6$ and $R^7$ are of 50 and 75 ohms, respectively, whereby for every position of the disk 35 about 100 ohms will be shunted across the terminals of the resistance R. But with rise in temperature of the solution $d$ there will be an increase in resistance of the circuit in shunt to the resistance R due to the positive temperature coefficient of the resistance N$i$. For different positions of the disk 35 the relative proportions of nickel to manganin in circuit across the terminals of resistance R will be different, whereby the corrective effect due to change in resistance of the wire N$i$ is largest when segment 37 is in engagement with the brush 75 and smallest when segment 36 is in engagement with brush 75, but in all positions of disk 35 there is some compensation for temperature changes of the solution $d$.

The conductors 77 and 78 are connected to any suitable source of current, not shown, preferably a constant potential source, and through the switch 79 the conductors 80 and 81 are brought into communication with said source. From the conductor 80 connection is made through the conductor $80^a$ with the stationary contact 82 co-operating with the segments 43, 44 and 45 upon the disk 42. The conductor $81^a$ connects conductor 81 with one terminal of the white incandescent electric lamp W$h$ whose other terminal connects with the contact segment 44. The segment 43 is connected through the conductor 84, contact $29^b$, brush $30^b$ and the blue incandescent lamp $B^1$ to one terminal of the solenoid winding 85, whose other terminal connects through conductor 86 with the brush 87 bearing upon the contact segment 88, see also Fig. 6, secured upon the disk 89 of insulating material, which in turn is secured upon the shaft 90, the effect of engagement of brush 87 with the segment 88 being to connect the conductor $81^a$ to the conductor 86. Similarly, the contact segment 45 is connected through conductor 91, contact $29^b$, brush $30^b$ and the red incandescent electric lamp R$e$ with one terminal of the solenoid winding 92 whose other terminal connects by conductor 93 with a second brush 94 bearing upon the segment 88 but angularly spaced from the brush 87.

Upon energization of the solenoid winding 85 it moves its core $85^a$ upwardly, causing the contacts $85^b$ and $85^c$, insulated from each other, to engage and bridge the stationary contacts $85^d$, $85^e$ and $85^f$, $85^g$. Similarly, when solenoid winding 92 is energized, it moves its core $92^a$ upwardly, causing the contacts $92^b$ and $92^c$, insulated from each other, to engage stationary contacts $92^d$, $92^e$ and $92^f$, $92^g$. The power supply conductor 81 connects to contacts $85^d$ and $92^d$, while power supply conductor 80 connects with contacts $85^f$ and $92^f$. Contacts $85^e$ and $92^g$ are connected to each other and to the conductor 95, which connects to brush $95^a$ of armature A of an electric motor $M^1$. The contacts $85^g$ and $92^e$ are connected to each other and conductor 96, which connects to the other brush $96^a$ of the armature A. These solenoid operated switches are in effect reversing switch mechanism for reversing the connections of armature A to the supply circuit. The field winding F of the motor $M^1$ is connected by conductors 97 and 98 with conductors 80 and 81.

The motor armature A rotates a shaft 99 upon which is secured a worm 100 meshing with and driving the worm gear 101 secured upon and rotating the aforesaid shaft 90 which also actuates or rotates the movable elements of the valves V and $V^1$ controlling, respectively, the pipes 102 and 103, controlled respectively, by hand valves 104 and 105 and delivering into a reaction or mixing tank T, the materials in which are agitated or stirred by the paddle or other structure 106 rotated by shaft 107 which in turn is rotated by any suitable means, as for example, wheel 108 driven by belt 109.

The liquids or solutions after mixture or reaction in the tank T are discharged through the pipe 110 controlled by valve 111. To the pipe 110 is connected a branch pipe 112, controlled by hand valve 113, for delivering at suitable rate solution $d$ into the beaker or container $c$ of the control cell C, the solution $d$ overflowing and passing off through the pipe 114 which may return the solution to that discharged from pipe 110.

The operation is as follows:

Assuming that through the pipe 102 is delivered a solution of acid or a solution exhibiting an acid reaction and it is desired completely and exactly to neutralize the same so that there shall be delivered from the pipe 110 a neutral solution, there is delivered to the control cell C through a pipe 112 by suitable setting of the valve 113 a minute fraction of the solution continuously delivered through pipe 110. The neutral condition of the solution is such, therefore, as will correspond with the point $a$, Fig. 1, or either of points $a$ or $b$, Fig. 2. This means that for the neutral condition the control cell C will produce an electro-motive-force, voltage or potential difference equal to the voltage corresponding with the point $a$ of Fig. 1, or either of the points $a$ or $b$ of Fig. 2.

When the potentiometer controlling the automatic control apparatus is in that balance position corresponding to position of contact 32 in engagement with the resistance R at some such point as indicated at $32^a$, Fig. 5, and the brush 82 is in engagement with contact segment 44, the white lamp W$h$ is caused to glow and therefore to indicate that the solution flowing from pipe 110 is at the desired neutral or end point, the disk 42 being secured in such angular position upon the shaft 10 that the brush 82 is so in engagement with contact 44 for that angular position of the slide wire resistance R effecting a potentiometer balance for a voltage corresponding with the neutral or any other chosen or selected condition.

Assuming now that for some reason the acidity of the solution $d$ increases, the volttage produced by the cell C will, as indicated in Figs. 1 and 2, diminish, thereby causing an unbalancing of the potentiometer and a current in such direction through the coil 20 of the galvanometer G that its needle 19 deflects toward the right, Fig. 4, whereby due to periodic vertical movement of the member 15 by cam 12 driven by shaft 4 the needle 19 will be clamped between the inclined edge 18 and the lower edge 22 of the right hand member 23, causing the right hand arm 25 to be tilted on its pivot 24 in a clockwise direction, thereby pushing on the right hand pin 28 on plate 27 to tilt the movable or driving clutch member or arm 6 in a clockwise direction, while cam 11 is holding shoes 7, 7 from the rim 8 of the clutch wheel 9, the angular movement of the member 6 being dependent upon the degree of deflection of the needle 19 and therefore upon the degree of acidity of the solution $d$ in cell C. The cam 11 soon allows, because of further rotation of the shaft 4, the shoes 7, 7 again to grip the rim 8 of the disk 9, and soon thereafter the left hand cam 30 engages the left contact $29^b$, which has been elevated, pushing it downwardly, due to continued rotation of cam 30 by shaft 4, restoring arm 6 to horizontal position indicated, but in so moving back to normal position the member 6 rotates the clutch disk 9 in a counter-clockwise direction, rotating shaft 10 and the disks 31, 35 and 42 in like direction. By this action the potentiometer resistance R is moved in a counter-clockwise direction with respect to the contact 32 to vary the electro-motive-force of the potentiometer to or toward equality with the electro-motive-force produced by the cell C. Such counter-clockwise rotation of the shaft 10 has rotated disk 42, causing contact 82 to leave contact 44, thus extinguishing lamp W$h$, and to engage contact segment 45, thereby causing energization, through brush 82, segment 45, conductor 91, contact $29^b$ and co-acting cam 30, and brush $30^b$, of solenoid 92 and the rod lamp R$e$, the latter indicating said condition of solution $d$ and the former causing closure of the circuit of motor armature A, thereby energizing the motor and causing it to run in such direction as to impart a closing movement to the acid valve V and an opening movement to the valve $V^1$ through which alkali is delivered by pipe 103 into tank T. The cam 30 causes closure of the circuit of the solenoid 92, and therefore an energization of the motor $M^1$, for a time which is dependent upon the degree of unbalancing or degree of acidity, this being reflected by the degree of angular movement which is given to the arm 6 before engagement thereof by the cam 30. If after the first rotation of the shaft 4 accomplishing the above mentioned results the acidity has decreased, the voltage of the cell C will have increased, the deflection of the galvanometer will have been decreased and for the next cycle of operation of the shaft 1 and its control parts the length of contact of left hand cam 30 with contact $29^b$ will be shorter than before, causing a shorter energization of motor $M^1$. This action is continued until a point is reached at which the potentiometer circuit is balanced, the solution being still acid, but the difference in voltage produced by the acid solution and the desired neutral solution being compensated by movement of resistance R with respect to contact 32. The cam 30 contacts with contacts $29^a$ and $29^b$ through a small angle of revolution when member 6 is in horizontal position, and so long as contact 82 is on quadrant 45 each revolution of cam 30 will cause actuation of solenoid 92, motor M¹ and valves V and V¹ to increase the addition of alkali and decrease the addition of acid. By this action the voltage of cell C will be increased, causing galvanometer needle 19 to deflect to the left and a reversal of the movement above described of member 6 and disks 31, 35 and 42. This action continues with continued additions of alkali so long as contact 82 is in contact with quadrant 45 until the desired neutral or end point is reached and the apparatus, excepting valves V and V¹, has returned to its initial position with red light Re extinguished and the white light W again glowing.

Obviously, if the solution should become too alkaline the voltage of the cell C will rise above the voltage corresponding with the end or neutral point $a$, Fig. 1, or $a$ or $b$, Fig. 2, and the galvanometer G will deflect to the left, effecting, in manner above described, a clockwise rotation of the shaft 10 and the attached disks, with the result that the brush 82 will engage contact 43, causing energization of blue lamp B¹, indicating alkalinity, and energization of the solenoid 85, which will close the circuit of the armature A of the valve actuating motor M¹, but the current of the armature A in this instance will be reversed, from what it was when solenoid 92 was energized, causing a reversal of movement of the motor M¹, thereby effecting a corresponding degree of closure of the alkali valve V¹ and of opening of the acid valve V.

By this mode of operation the apparatus automatically under control of the cell C and in response to changes of its electromotive-force, continuously controls the proportions of acid and alkali in effecting a neutral effluent continuously delivered from pipe 110.

While there has been described an action of the valves V and V¹ in opposite directions, one of them may be omitted or disconnected from the shaft 90, whereupon only one of the valves may be operated, nevertheless changing the proportions of acid and alkali and operating in principle substantially the same as above described.

In case a degree of acidity or of alkalinity, other than the effecting a neutral solution, is desired, it is simply necessary suitably to adjust the angular position of disk 42 upon shaft 10 to bring the contact 44 into engagement with brush 82 when there is a balance for an eltctro-motive-force of the cell C for any desired or predetermined degree of acidity or alkalinity.

While for purposes of simplicity the apparatus has been described as operating in response to changes in hydrogen ion concentration, it will be understood that it will operate in like manner in response to changes in concentration of other than hydrogen ions, it being then simply necessary, as hereinbefore described, suitably to vary the nature or structure of the cell C to suit the particular ion involved.

As a further refinement which may be of importance in some cases, automatic temperature compensating circuits above described are provided. For this purpose the disk 35 is secured in such angular position upon the shaft 10 that for positions of the disk 31 corresponding to high voltage of the cell C, that is, corresponding with predominance of alkali or equivalent condition, more of the resistance N$i$, the one having high temperature coefficient, and less of the zero temperature coefficient or manganin wire will be in circuit; and vice versa, for low voltages, as for predominating acid conditions or equivalent, less of the resistance N$i$ and more of the zero temperature coefficient resistance will be in the circuit connected in shunt to the slide wire resistance R. In the position indicated in Fig. 5 the disk 31 is in a position corresponding with predominance of acid condition, that is, low voltage of the cell C. In this position it will be noted that the resistance R⁷, of manganin or zero temperature co-efficient, and the smallest portion of the resistance N$i$ are in series with each other in shunt to the potentiometer slide wire resistance R; and as the disk 35 rotates in clockwise direction, corresponding with decreasing acidity and increasing alkalinity, there is progressively brought into the circuit shunting the resistance R greater amounts of the reistance N$i$ and lesser amounts of the manganin or zero temperature coefficient resistances, their amounts being complementary for all portions of disk 35 to effect the same total resistance at a given temperature, as 20 degrees C.

Accordingly, with a rise in temperature of the solution $d$ the total resistance in shunt to the resistance R increases, due to the positive temperature coefficient of the reistance N$i$; and for decreasing temperatures the resistance of the shunt path decreases. The proportion of positive temperature coefficient resistance to zero temperature coefficient resistance is simultaneously varied automatically in accordance with the voltage produced by the cell C, which in turn depends upon the variation in ion concentration.

The extent of rotation of armature A of the valve operating motor in either direction is limited by suitably choosing the length of the commutator segment 88 and the location of the brushes 87 and 94. Referring to Fig. 6, when the disk 89 rotates a predetermined distance, the brush 87 passes off of segment 88, and when rotating in opposite direction brush 94 passes off of segment 88, thereby interrupting the circuits of the solenoids 85 and 92 and so deenergizing the motor M¹.

With apparatus of the character hereinbefore described in connection with Figs. 4 and 5, there is a time element or time lag involved between actuation of the shaft 10 and the deflection of the galvanometer, because the constantly rotating shaft 4 brings one or the other of the cams 30 only periodically, and for a part of each revolution only, into co-action with the arm 6 in restoring it to normal for actuating the shaft 10. For a given deflection of the galvanometer, responding to actuation of the valves V, V$^1$ or either of them, the actuation of the shaft 10 is discontinuous and periodic, so long as the galvanometer continues to deflect. In other words, the control effected by the shaft 10 is not complete and instantaneous in response to a given deflection of the galvanometer, but is delayed, and effected by periodic steps due to the periodic engagement of one or the other of the cams 30 with the end of the arm 6.

Referring to Fig. 7, there is disclosed an automatic system of the general character hereinbefore described, relating, however, to the control of batches of solution as distinguished from continuous operation. In this case there is delivered into the reaction tank T through pipe 102 and valve 104 a batch of solution which for purposes of explanation will be assumed to be predominatingly acid, and which it is desired to neutralize, or to be brought to any desired degree of acidity or alkalinity, by delivering suitable total amount of alkali through pipe 103 controlled by the motor actuated valve V$^1$.

In this case the pipe 112 delivering solution to the cell C may extend into the tank T, preferably to some distance above its bottom, thereby to extend above the sludge or precipitate that may collect in the bottom of the tank T. There is drawn from the tank T continuously by proper setting of valve 113 a small fraction of the contents of the tank T. The cell C controls, as hereinbefore described, the actuation of the shaft 10 and the disks thereon. In this instance the disks 31 and 35 are similar to those described in connection with Fig. 5, and the circuit arrangements involving them are also similar. The disk 42, however, in this instance bears upon its periphery a series of contact segments 115 to 120 inclusive, insulated from each other, and connected, respectively, by conductors 115$^a$ to 120$^a$, inclusive, to contact segments 121 to 126 inclusive, insulated from each other and carried by the disk or wheel 127 secured upon the shaft 90. Co-acting with the contact segments upon the disk 42 is the stationary brush 128 connected to conductor 80$^a$.

Bearing upon the disk 127 is the brush 130 connected by conductor 131 through the indicating lamp L to the solenoid 132 whose other terminal connects to the conductor 81$^a$. The solenoid core 133 rises, when coil 132 is energized, and brings contacts 134 and 135, insulated from each other, into engagement, respectively, with contacts 136, 137 and 138, 139, of which 136 and 138 connect, respectively, with the supply circuit conductors 81 and 80, 80, and contacts 137 and 139 connect, respectively, through conductors 140 and 141 with the armature A of the valve operating motor M$^1$ whose field F is connected by conductors 97 and 98 to the conductors 80 and 81. Between conductors 80, 81 and conductors 140 and 141 intervenes the switch 142, which when closed, when the solenoid 132 is deenergized, connects the armature A in reverse sense to the conductors 80 and 81, causing it to rotate in direction opposite to that occurring when solenoid 132 is energized.

The operation is as follows:

After the batch of acid solution is delivered into the tank T, the valve 104 being then closed, the valve V$^1$ is brought to open position in which it passes most alkali solution through pipe 103. As the acidity decreases the voltage of the cell C increases and the disk 42 will be rotated in clockwise direction, as viewed in Fig. 7, and contact 120 will be brought into engagement with brush 128, whereupon the indicating lamp L and solenoid 132 will be energized through conductor 120$^a$, brush 130 and conductor 131, and the armature A will accordingly be energized and it will rotate in such direction as to rotate the disk 127 in clockwise direction indicated by the arrow, rotating the shaft 90 partially to close the valve V, and so decrease the flow of alkali into tank T. The motor M$^1$ will, however, rotate until contact 121 leaves brush 130, brush 128 still being in engagement with contact 120 on disk 42. The circuit of the solenoid 132 is accordingly broken, the core structure 133 descends, and the motor M$^1$ is deenergized. The valve V$^1$ therefore stops in a position less open than before. The continuing influx of alkali into the tank T, however, is reflected by a decrease of acidity of the solution $d$ in the cell C whose electro-motive-force accordingly increases, and the disk 42 is further rotated in clockwise direction until contact 119 engages brush 128, whereupon the circuit of the solenoid 132 is again completed because the disk 127 had previously stopped with the brush 130 on contact 132. The motor M$^1$ is again energized and rotates the disk 127 and valve V$^1$ further in the same direction as before, further closing valve V$^1$, and again interrupting the circuit of the motor armature A until contact 118 engages brush 128 when the motor is again energized. And so on, step by step, the valve V$^1$ is further and further closed, the alkali in the tank T, however, progressively increasing until the solution is neutral, in which case the contact 115 is in engagement with brush 128, causing energization of the armature A to complete the closing movement of the valve V¹, the contact 126 then passing off of brush 130.

By the co-action of the segments on disks 42 and 127 the motor is periodically stopped and started, whereby in effect a time lag in the operation of the valve V¹ is introduced, preventing overshooting or introduction of too much alkali into the tank T. By so periodically interrupting the progress of closure of the valve V¹ there is introduced a second time lag or time element in addition to that effected by period actuation of shaft 10 by either cam 30, and the apparatus has time to respond to the effect of the alkali theretofore introduced, and the introduction of alkali is progressively tapered off and eventually ceases just as the solution in the tank T becomes neutral. The batch may then be drawn off through pipe 110 through valve 111, and the operation repeated on a new batch.

For returning the apparatus to starting position, the disk 42 will be brought to the position indicated in Fig. 7, and while the solenoid 132 is deenergized, the switch 142 may be closed, causing rotation of armature A in a reverse direction, opening the valve V¹ and returning the disk 127 to starting position, which is indicated to the operator of the switch 142 when the mark 143 upon disk 127 comes opposite to the stationary pointer or indicator at 44.

By the rotation of the shaft 4 the commutator segment 60 periodically bridges the brushes 61 and 62, thereby periodically bringing the cell C into circuit. The segment 60 preferably is of such angular extent and occupies such angular position upon the shaft 4 that the brushes 61 and 62 are engaged and bridged at such time as the galvanometer needle 19 is free to deflect, that is, when cam 12 is not lifting frame 15. When the electro-motive-force of the cell C is exactly balanced by the fall of potential across that part of the potentiometer circuit bridged by the galvanometer and cell circuit, no current flows in the cell circuit. But at all times when there is inequality between electro-motive-force of the cell C and the potential difference in the potentiometer circuit, there is a flow of current through the cell, and such current tends to polarize the cell. Therefore by introducing the commutator structure described, whereby the cell circuit is only part of the time closed, the polarization effects in the cell are materially reduced.

In lieu of a galvanometer of the character described, there may be employed an electrometer, herein included in the term galvanometer, whose moving element will correspond with the needle 19 and effect the controls effected by that needle. In such case polarization is practically nil and the commutator 60 with brushes 61 and 62 may be omitted and a direct or uninterrupted connection between cell C and the potentiometer employed.

While the mechanism is operating as hereinbefore described, there is produced upon the record paper P, which is continuously fed past the marker 49 in engagement therewith, a record of progress of chemical action or a process controlled by the apparatus, distances transversely of the paper P as viewed in Fig. 1 representing potential differences or degrees of ion concentration, while distances longitudinally of the paper P may represent time or quantities of solution or material added under the control of the apparatus. Such a record mark is indicated by the line y upon the paper P.

While in my preferred method and apparatus I employ a cell of the character described, to wit, a cell producing variation of voltage with variation of ion concentration, such potential difference being employed as the fundamental controlling factor, as distinguished from conductivity or other characteristic of the solution, it will be understood that some features of my invention are not limited to the use of such a cell, but are applicable also under circumstances and conditions involving fundamental controls of different kinds.

With regard to the particualr type of control apparatus illustrated herein by way of preferred example, it will be noted that the extent of control effected, as extent or amount or rate of addition of reagent or equivalent, or amount or rate of change of relation between a plurality of solutions or materials, is proportional to the extent of unbalancing of the potentiometer circuit; and this when a control cell of the type described is employed, is dependent upon its voltage and therefore upon the ionic concentration.

While I have hereinbefore referred to the admixture of solutions or materials capable of reacting with each other, it will be understood also that the materials mixed by control of the character herein described need not react with each other. For example, an alkaline or acid solution may have added thereto merely water for dilution purposes, for in such case also the ionic concentration varies with dilution.

What I claim is:

1. The method which consists in producing an electro-motive-force varying in response to variations in concentration of a selected ion, and controlling in response to variations of said electro-motive-force the supply of a material.

2. The method which consists in producing an electro-motive-force varying in response to variations in concentration of a selected ion, controlling in response to variations of said electro-motive-force the supply of a material, and causing said material supplied to vary the ionic concentration to effect a variation of said electro-motive-force.

3. The method which consists in producing an electro-motive-force varying in response to variations in concentration of a selected ion, and producing in response to variations of said electro-motive-force a control whose magnitude is dependent upon the magnitude of variation of said electro-motive-force.

4. The method which consists in producing an electro-motive-force varying in response to variations in concentration of a selected ion, and controlling in response to variations of said electro-motive-force the flow of a material, and causing said material to produce further variation of said electro-motive-force.

5. The method of proportioning materials with respect to each other, which consists in producing an electro-motive-force dependent upon the concentration of a selected ion of one of said materials, and controlling another of said materials in accordance with variations of said electro-motive-force.

6. The method of admixing materials, which consists in producing an electro-motive force dependent upon the concentration of a selected ion of a mixture of said materials, and varying the proportions of said materials in response to variations of said electro-motive-force.

7. The method of admixing materials, which consists in producing an electro-motive-force varying in accordance with the concentration of a selected ion of a product of reaction of said materials with each other, and varying the proportions of said materials in response to a variation of said electro-motive-force to effect a reaction product having a predetermined ionic concentration.

8. The method of maintaining a predetermined concentration of a selected ion of a flowing liquid, which consists in producing an electro-motive-force varying with variation of the concentration of said selected ion, and varying in response to variations of said electro-motive-force the flow of a reagent into admixture with said liquid effecting a variation in the ionic concentration toward a predetermined limit.

9. The method of proportioning acid and alkaline solutions to produce a neutral solution or a solution of predetermined acidity or alkalinity, which consists in producing an electro-motive-force varying with the hydrogen ion concentration of the product of reaction of said solutions, and varying the proportions of said solutions to each other in response to variation of said electro-motive-force whereby the hydrogen ion concentration is varied to a magnitude characteristic of a neutral solution or of a solution of predetermined acidity or alkalinity.

10. Control apparatus comprising the combination with a control cell producing an electro-motive-force varying with the ionic concentration of its electrolyte, said cell having an electrode of a character causing said electro-motive-force to represent the concentration of a selected ion of said electrolyte, of mechanical means movable to different positions to effect a control, and means responsive to the variations in electro-motive-force due to said selected ion of said electrolyte controlling said means.

11. Control apparatus comprising the combination with a control cell producing an electro-motive-force varying with the ionic concentration of its electrolyte, said cell having an electrode of a character causing said electro-motive-force to represent the concentration of a selected ion of said electrolyte, of valve structure, means for actuating the same, and means controlling said actuating means responsive to variations in electro-motive-force due to said selected ion of said electrolyte.

12. Control apparatus comprising the combination with a control cell producing an electro-motive force varying with the ionic concentration of its electrolyte, said cell having an electrode of a character causing said electro-motive-force to represent the concentration of a selected ion of said electrolyte, of valve structure controlling the flow of material effecting change in the concentration of said selected ion of said electrolyte, and means controlled by said cell controlling said valve structure.

13. Apparatus for effecting a predetermined concentration of a selected ion of a solution, comprising means for delivering to said solution a second solution adapted to vary the concentration of said selected ion, a control cell producing an electro-motive-force dependent upon said ionic concentration, and means controlling delivery of said second solution controlled in response to change in electro-motive-force of said cell.

14. Apparatus for varying the proportions of continuously flowing solutions to effect a mixture having a predetermined concentration of a selected ion comprising a control cell whose electrolyte is the mixture of said solutions, said cell having an electrode of a character causing said electro-motive-force to represent the concentration of a selected ion of said electrolyte, and means varying the flow of one or both of said solutions in accordance with variations of electro-motive-force of said cell.

15. Apparatus for controlling admixture of chemical reagents to effect a product of predetermined chemical charactertistic comprising a control cell producing an electromotive-force varying with the ionic concentration of said product, a galvanometer responsive to the electro-motive-force of said cell, a source of power, electrical means adapted to produce a change in the deflection of said galvanometer, said galvanometer controlling by its deflection actuation of said electrical means by said source of power, valve structure controlling the proportions of said reagents to each other, and means for controlling said valve structure actuated by said source of power under control of said galvanometer.

16. Apparatus for controlling admixture of chemical reagents to effect a product of predetermined chemical characteristic comprising a control cell producing an electromotive-force varying with the ionic concentration of said product, a galvanometer responsive to the electro-motive-force of said cell, a source of power, electrical means adapted to produce a change in the deflection of said galvanometer, said galvanometer controlling by its deflection actuation of said electrical means by said source of power to change the deflection of said galvanometer, valve structure controlling the proportions of said reagents, and means actuated by said source of power in unison with said electrical means controlling said valve structure to produce in the product an approach of its ionic concentration to that corresponding with said predetermined chemical characteristic.

17. Apparatus for controlling admixture of chemical reagents to effect a product of predetermined chemical characteristic comprising a control cell producing an electromotive-force varying with the ionic concentration of said product, a potentiometer circuit, a galvanometer associated therewith and with said cell, a source of power, means actuated by said source of power under control of said galvanometer for varying a resistance of said potentiometer tending to reduce the deflection of said galvanometer to zero, valve structure controlling proportionment of said reagents, and means actuated by said source of power in unison with said resistance varying means controlling said valve structure to produce in the product a change of ionic concentration approaching that corresponding with said predetermined chemical characteristic.

18. The combination with sources of solutions of different chemical characteristics, of valve structure for varying the proportions of said solutions, a reversible motor for actuating said valve structure in opposite directions, control switch structure effecting operation of said motor in opposite directions, a cell having for electrolyte one of said solutions or a mixture of them and having electrodes of a character producing an electro-motive-force dependent upon the concentration of a selected ion, a galvanometer responsive to the electro-motive-force of said cell, a source of power, and means controlled by said galvanometer controlling actuation by said source of power of said control switch mechanism.

19. The combination with an electrolytic cell, of a galvanometer co-operating therewith and whose deflection depends upon an electro-chemical characteristic of the electrolyte of said cell, a source of power, electrical means adapted to produce a change in the deflection of said galvanometer, the deflection of said galvanometer controlling actuation of said electrical means by said source of power, and means for compensating for temperature changes in the electrolyte of said cell comprising resistances having different temperature coefficients, and switching means actuated in unison with said electrical means for changing the proportions of the resistances of different temperature coefficients.

20. The combination with an electrolytic cell, of a potentiometer circuit, a galvanometer co-operating therewith and with said cell, a source of power, means for varying a resistance of said potentiometer to vary the deflection of said galvanometer, the deflection of the galvanometer controlling actuation of said resistance varying means by said source of power, and temperature compensating means applied to said potentiometer circuit comprising resistance having a temperature coefficient and subjected to the temperature of the electrolyte of said cell, and switching means actuated in unison with said resistance varying means for varying the amount of said resistance in circuit.

21. The method of producing a predetermined ionic concentration in a liquid, which consists in producing an electro-motive-force varying with variations in concentration of a selected ion of the liquid, and varying the ionic concentration of said liquid under control of said electro-motive-force.

22. The method of producing and maintaining a predetermined ionic concentration in a liquid, which consists in producing an electro-motive-force varying with variations in the concentration of a selected ion of said liquid, and varying the ionic concentration of said solution toward said predetermined value in response to electro-motive-force other than that corresponding to said predetermined value.

23. The method which consists in producing an electro-motive-force varying in response to variations in the concentration of a selected ion of a fluid, varying the ionic concentration of said fluid in response to variations in said electro-motive-force, and modifying the effect of said electro-motiveforce in response to variations of temperature of said fluid.

24. The method which consists in producing an electro-motive-force varying in response to variations in the concentration of a selected ion of a fluid, supplying material to said fluid under control of said electro-motive-force to vary the ionic concentration of said fluid, and modifying the effect of said electro-motive-force in response to changes in temperature of said fluid.

25. The method of controlling chemical reactions, which consists in bringing chemical reagents into reacting relation, producing an electro-motive-force varying with variations in concentration of a selected ion of the reaction product, and controlling the supply of said chemical reagents in response to variations in said electro-motive-force.

26. The method of controlling chemical reactions, which consists in supplying chemical reagents capable of reacting, allowing said reagents to react, producing an electro-motive-force varying with variations in the concentration of a selected ion of the reaction product, controlling the supply of said reagents by said electro-motive-force, and varying the effect of said electro-motive-force upon the supply of said reagents in response to variations in temperature of said reaction product.

27. Control apparatus comprising an electrolyte, means producing an electro-motive-force varying with the concentration of a selected ion of said electrolyte, means for varying the ionic concentration of said electrolyte, and means controlled by said electro-motive-force controlling said second named means.

28. Control apparatus comprising an electrolyte, means for producing an electro-motive-force responsive to variations in the concentration of a selected ion of said electrolyte, means responsive to variations in said electro-motive-force varying said ionic concentration, and means responsive to changes of temperature of said electrolyte for modifying the effect of said electro-motive-force.

29. The combination with a cell comprising an electrolyte and electrodes of different characters for producing an electro-motive-force, one of said electrodes having a character causing said electro-motive-force to represent the concentration of a selected ion of said electrolyte, of a device responsive to variations of said electro-motive-force, and means for modifying the effect of said electro-motive-force upon said device in response to changes in temperature of said electrolyte.

30. The combination with an electrolytic cell, an electric circuit including said cell, a resistance in said circuit, a plurality of electric circuits each comprising complementary resistances of high and low temperature coefficient, said resistances of high temperature coefficient subjected to changes in temperature of the electrolyte of said cell, and means responsive to changes in electro-motive-force of said cell for connecting each circuit of said series of circuits in shunt with said first named resistance.

31. The combination with an electrolytic cell producing an electro-motive-force varying with variations in the concentration of a selected ion of the electrolyte, means for varying the ionic concentration of said electrolyte and means controlled by said electro-motive-force controlling said means.

32. The combination with a potentiometer circuit, of a galvanometer in said circuit, an electrolytic cell in said circuit, said galvanometer operating in response to changes in electro-motive-force of said cell due to changes in ionic concentration of the electrolyte of said cell, a variable resistance in said circuit, means operated under control of said galvanometer varying said resistance to restore a balance in said circuit, and means operated under control of said galvanometer varying the ionic concentration of said electrolyte.

33. The combination with an electrolytic cell producing an electro-motive-force varying with variations in ionic concentration of the electrolyte of said cell, an electric circuit including said cell, a galvanometer in said circuit responsive to changes in electro-motive-force of said cell, a variable resistance in said circuit, means controlled by said galvanometer varying said resistance, a plurality of electric circuits, said circuits comprising resistances having different temperature coefficients subjected to the same temperature conditions as said electrolyte, and means controlled by said galvanometer for connecting any one of said circuits in shunt with said variable resistance.

34. The combination with an electrolytic cell, a potentiometer circuit, a galvanometer co-operating therewith and with said cell, a source of power, means operated by said source of power under control of said galvanometer varying the ionic concentration of the electrolyte of said cell, a variable resistance in said potentiometer circuit, means operated by said source of power under control of said galvanometer varying said resistance, a plurality of resistances having different temperature coefficients adapted to be connected in shunt with said variable resistance, and means operated by said source of power under control of said galvanometer connecting said resistances.

35. Apparatus for controlling chemical reactions, comprising an electrolytic cell, means for supplying a chemical reagent to the electrolyte of said cell, a potentiometer circuit including said cell, a galvanometer in said circuit, a source of power, a movable structure operated by said source of power under control of said galvanometer, means operated by said structure varying the supply of said reagent, and means operated by said source of power indicating the condition of said electrolyte.

36. The combination with an electric circuit, a galvanometer responsive to changes in electro-motive-force in said circuit, a variable resistance in said circuit, a plurality of pairs of resistance elements adapted to be associated with said resistance, the elements of each pair having, respectively, substantial and zero temperature coefficients, said elements of substantial temperature coefficient having different resistances, each pair of elements having the same resistance at a given temperature, a source of power, and a movable structure actuated by said source of power under control of said galvanometer varying said variable resistance and associating said pairs of resistance elements with said variable resistance.

37. The combination with an electric circuit and a source of electro-motive-force therein, of a plurality of pairs of resistance elements adapted to be connected in said circuit, the elements of each pair having, respectively, substantial and zero temperature coefficients, the elements of substantial temperature coefficient having different resistances, each pair of elements having the same resistance at a given temperature, and means responsive to changes in electro-motive-force connecting one or another of said pairs of resistance elements in said circuit.

38. The combination with an electric circuit and a source of electro-motive-force therein, of a plurality of resistance elements adapted to be connected in said cicuit having the same resistance at a given temperature and having different temperature coefficients, and means for connecting any one of said elements in said circuit.

39. The combination with an electric circuit and a source of variable electro-motive-force therein, of a variable resistance in said circuit, a plurality of pairs of resistance elements adapted to be connected in said circuit, each pair of elements comprising a positive and a zero temperature coefficient element aggregating the same resistance value at a given temperature, the several positive temperature coefficient elements having different resistances, means for increasing said variable resistance with increase in electro-motive-force, and means for connecting members of said plurality of pairs of resistance elements having positive temperature coefficient elements of greater resistance in said circuit as said electro-motive-force increases.

40. The combination with an electric circuit and a source of variable electro-motive-force in said circuit, a galvanometer associated with said circuit and actuated by variations in said electro-motive-force, a source of power, a variable resistance in said circuit, a series of resistance circuits having the same resistance at a given temperature and different positive temperature coefficients subjected to temperature changes of said source of electro-motive-force, a movable structure operated by said source of power under control of said galvanometer increasing said variable resistance, and successively connecting members of said series having progressively greater positive temperature coefficients in said circuit with increase in said electro-motive-force.

41. The combination with a galvanometer, a variable resistance controlling deflection of said galvanometer, a source of power, means actuated by said source of power under control of said galvanometer varying said resistance, and a variable resistance in shunt with said first named resistance actuated with said first named means.

42. The combination with a galvanometer, a variable resistance controlling deflection of said galvanometer, a source of power, means actuated by said source of power under control of said galvanometer varying said resistance, means for varying the effect of said resistance comprising a plurality of resistances adapted to be connected in shunt with said variable resistance, and switching mechanism actuated by said source of power under control of said galvanometer controlling said means.

43. The combination with a deflecting member, of a variable resistance controlling deflection thereof, a source of power, means actuated by said source of power under control of said deflecting member varying said resistance, a series of resistance elements for varying the effect of said variable resistance, the members of said series of resistances having the same resistance at a given temperature and having different temperature coefficients, and means actuated with said first named means controlling said series of resistance elements.

44. The combination with a deflecting member, of a variable resistance controlling deflection thereof, a source of power, means actuated by said source of power under control of said deflecting member varying said resistance, a plurality of pairs of resistance elements for varying the effect of said variable resistance, the elements of each pair having, respectively, substantial and zero temperature coefficients, the elements of substantial temperature coefficient having different resistances, each pair of elements having the same resistance at a given temperature, and means actuated by said source of power under control of said deflecting member controlling operation of said pairs of resistance elements.

45. The combination with a deflecting member, of a variable resistance controlling deflection thereof, a source of power, means actuated by said source of power under control of said deflecting member varying said resistance, a plurality of pairs of resistance elements for varying the effect of said variable resistance, each pair comprising a positive and a zero temperature coefficient element aggregating the same resistance value at a given temperature, the several positive coefficient elements having different values, and switching means actuated by said source of power under control of said deflecting member controlling operation of said pairs of resistance elements.

46. Control apparatus comprising an electrolyte, a deflecting member movable in response to changes in a characteristic of said electrolyte, means for varying said characteristic of said electrolyte, a source of power, a movable contact member actuated by said source of power under control of said deflecting member, a contact member operated by said source of power engaging said movable contact member for a period of time varying with the degree of deflection of said deflecting member, and electric circuits controlled by said contacts operating said first named means.

47. A control apparatus comprising an electrolyte, means for varying the ionic concentration of said electrolyte, a deflecting member responsive to changes in ionic concentration of said electrolyte, a source of power, a pair of contacts actuated by said source of power under control of said deflecting member, a second pair of contacts moved by said source of power periodically to position to engage one or the other of the contacts of said first named pair depending upon the direction of deflection of said deflecting member and for a period varying with the degree of deflection of said deflecting member, electrical circuits controlled by said contacts, said electrical circuits controlling said first named means.

48. Control apparatus comprising an electrolyte and means for varying the ionic concentration thereof, a source of power, a pair of contacts actuated by said source of power in response to variations in ionic concentration of said electrolyte, said contacts moving in different directions in response to changes in ionic concentration of said electrolyte, said contacts moving a distance varying with the degree of change in ionic concentration of said electrolyte, a second pair of contacts periodically moved in fixed paths traversed by said first named contacts, and electric circuits controlled by said contacts controlling said first named means.

49. Control apparatus comprising the combination with an electrolytic cell, a pair of contacts moved in different directions in response to changes in a characteristic of the electrolyte of said cell, said contacts moving a distance varying with the degree of change in said characteristic of said electrolyte, a second pair of contacts periodically moved in fixed paths traversed by said first named contacts, electric circuits controlled by said pairs of contacts, lamps in said circuits indicating the condition of said electrolyte, and means controlled by said circuits for varying said characteristic of said electrolyte.

50. Control apparatus comprising an electrolytic cell producing an electro-motive-force varying with the ionic concentration of the electrolyte, a galvanometer, a source of power, a movable structure actuated by said source of power under control of said galvanometer, means operated by said movable structure varying the ionic concentration of the electrolyte of said cell, and switching mechanism periodically connecting said cell with said galvanometer.

51. In combination, a galvanometer, an electrolytic cell and a resistance controlling deflection of said galvanometer, and a resistance having substantial temperature co-efficient subjected to the temperature of the electrolyte of said cell and connected in shunt with said first named resistance for modifying its effect upon said galvanometer.

52. The combination with a cell comprising electrolyte and electrodes, one of said electrodes being of a character for causing said cell to produce an electro-motive-force representative of a selected ion of said electrolyte, a potentiometer circuit comprising a resistance, a source of current and a galvanometer, said cell associated with said potentiometer to affect said galvanometer, and a resistance connected in circuit with said potentiometer, said last named resistance having a substantial temperature co-efficient and subjected to the temperature of the electrolyte of said cell.

53. Control apparatus comprising a deflecting member, a source of power, a movable contact member actuated by said source of power under control of said deflecting member, a second contact member operated by said source of power engaging said first contact member for a period of time varying with the degree of deflection of said deflecting member, and a control circuit controlled by said co-acting contact members.

54. Control apparatus comprising a deflecting member, a source of power, a movable contact member actuated by said source of power under control of said deflecting member, a second contact member moved by said source of power periodically into engagement with said first contact member for a period of time varying with the degree of deflection of said deflecting member, and a control circuit controlled by said co-acting contact members.

55. In a control system, a device for effecting the desired control, a motive device for actuating said control device, a galvanometer and circuit connections therefor whereby movement of said first named device effects control of said galvanometer, a source of power, a movable structure actuated by said source of power under control of said galvanometer, means rendering the actuation of said movable structure discontinuous during a deflection of said galvanometer, whereby a time lag is introduced, and means controlled by said movable structure effecting interrupted control of said motive device, whereby a second time lag is introduced in the control of said first named device.

56. In a control system, a device for effecting the desired control, a motive device for actuating said control device, a galvanometer and circuit connections therefor whereby movement of said first named device effects control of said galvanometer, a source of power, a movable structure actuated by said source of power under control of said galvanometer, switching mechanism movable with said first named device and comprising a series of contacts, switching mechanism movable with said movable structure and comprising a series of contacts connected with the contacts of said first named series, said series of contacts and their connections effecting interrupted control of the circuit of said motive device.

57. Control apparatus comprising the combination with a control cell producing an electro-motive-force varying with the ionic concentration of its electrolyte, of mechanical means movable to different positions to effect a control, a source of potential difference in circuit with said control cell, a galvanometer in said circuit responsive to the effects of the potential of said source and to the electro-motive-force of said control cell, and means controlling said mechanical means controlled by said galvanometer.

58. Control apparatus comprising the combination with a control cell producing an electric-motive-force varying with the ionic concentration of its electrolyte, of mechanical means movable to different positions to effect a control, a source of potential difference in circuit with said control cell, a galvanometer in said circuit responsive to the effects of the potential of said source and to the electromotive-force of said control cell, movable structure controlled by said galvanometer for controlling said mechanical means and for varying the difference of potential in circuit with said cell.

59. Apparatus for controlling admixture of solutions, comprising a control cell producing an electro-motive-force varying with the concentration of a selected ion of at least one of said solutions, a circuit including said cell, a galvanometer, a second source of electro-motive-force, means controlling delivery of one of said solutions controlled by said galvanometer, and means controlled by said galvanometer for changing the relation of the magnitudes of the electro-motive-forces of said cell and said second source.

60. Apparatus for controlling admixture of solutions, comprising a control cell producing an electro-motive-force varying with the concentration of a selected ion of at least one of said solutions, a potentiometer circuit including said cell and a galvanometer, a movable structure whose movements are controlled by said galvanometer, means actuated by said movable structure for balancing said potentiometer, and means controlling the delivery of at least one of said solutions controlled by said movable structure.

In testimony whereof I have hereunto affixed my signature this 15 day of April, 1920.

EARL A. KEELER.